US012321663B2

(12) United States Patent
Meredith et al.

(10) Patent No.: US 12,321,663 B2
(45) Date of Patent: Jun. 3, 2025

(54) LEVERAGING VISUAL DATA TO ENHANCE AUDIO RECEPTION

(71) Applicants: AT&T Intellectual Property I, L.P., Atlanta, GA (US); AT&T Mobility II LLC, Atlanta, GA (US)

(72) Inventors: Zachary Cleigh Meredith, Eagle River, AK (US); Peter Hardie, Cumming, GA (US); Sheldon Kent Meredith, Roswell, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 255 days.

(21) Appl. No.: 17/804,722

(22) Filed: May 31, 2022

(65) Prior Publication Data

US 2023/0385015 A1 Nov. 30, 2023

(51) Int. Cl.
*G06F 3/16* (2006.01)
*G10K 11/178* (2006.01)

(52) U.S. Cl.
CPC .............. *G06F 3/165* (2013.01); *G06F 3/162* (2013.01); *G10K 11/17821* (2018.01)

(58) Field of Classification Search
CPC .... G06F 3/165; G06F 3/162; G10K 11/17821
See application file for complete search history.

(56) References Cited

U.S. PATENT DOCUMENTS

| | | | | |
|---|---|---|---|---|
| 2011/0257971 A1* | 10/2011 | Morrison | ............. | G06V 30/142 |
| | | | | 704/235 |
| 2014/0342324 A1* | 11/2014 | Ghovanloo | .............. | G09B 5/06 |
| | | | | 434/185 |
| 2020/0105262 A1* | 4/2020 | Abhinav | ................. | G10L 15/25 |
| 2020/0106708 A1* | 4/2020 | Sleevi | ..................... | H04L 65/80 |

* cited by examiner

*Primary Examiner* — Joseph Saunders, Jr.

(57) ABSTRACT

In one example, a method includes calculating a signal to noise ratio of a captured audio stream, determining that the signal to noise ratio of the captured audio stream is lower than a predefined threshold, acquiring visual data of a source of the captured audio stream in response to the determining that the signal to noise ratio of the captured audio stream is lower than the predefined threshold, using the visual data to infer a sound that is being made by the source of the captured audio stream, indexing the sound that is being made by the source of the captured audio stream to a library index, and transferring the library index to a receiving user endpoint device.

20 Claims, 3 Drawing Sheets

LEVERAGING VISUAL DATA TO ENHANCE AUDIO RECEPTION

The present disclosure relates generally to voice communications, and relates more particularly to devices, non-transitory computer-readable media, and methods for leveraging visual data in order to enhance audio reception by a microphone.

BACKGROUND

Modern mobile wireless communications systems allow users to converse via phone from any location and at any time. For instance, mobile wireless communications allow users to make phone calls from home, work, the car or public transportation, the store, and the like. The audio quality of mobile wireless communications is constantly improving, making it easier for listeners to understand speakers (i.e., people who are speaking).

SUMMARY

In one example, the present disclosure describes a device, computer-readable medium, and method for leveraging visual data in order to enhance audio reception by a microphone. For instance, in one example, a method performed by a processing system including at least one processor includes calculating a signal to noise ratio of a captured audio stream, determining that the signal to noise ratio of the captured audio stream is lower than a predefined threshold, acquiring visual data of a source of the captured audio stream in response to the determining that the signal to noise ratio of the captured audio stream is lower than the predefined threshold, using the visual data to infer a sound that is being made by the source of the captured audio stream, indexing the sound that is being made by the source of the captured audio stream to a library index, and transferring the library index to a receiving user endpoint device.

In another example, a non-transitory computer-readable medium stores instructions which, when executed by a processing system, including at least one processor, cause the processing system to perform operations. The operations include calculating a signal to noise ratio of a captured audio stream, determining that the signal to noise ratio of the captured audio stream is lower than a predefined threshold, acquiring visual data of a source of the captured audio stream in response to the determining that the signal to noise ratio of the captured audio stream is lower than the predefined threshold, using the visual data to infer a sound that is being made by the source of the captured audio stream, indexing the sound that is being made by the source of the captured audio stream to a library index, and transferring the library index to a receiving user endpoint device.

In another example, a device includes a processing system including at least one processor and a computer-readable medium storing instructions which, when executed by the processing system, cause the processing system to perform operations. The operations include calculating a signal to noise ratio of a captured audio stream, determining that the signal to noise ratio of the captured audio stream is lower than a predefined threshold, acquiring visual data of a source of the captured audio stream in response to the determining that the signal to noise ratio of the captured audio stream is lower than the predefined threshold, using the visual data to infer a sound that is being made by the source of the captured audio stream, indexing the sound that is being made by the source of the captured audio stream to a library index, and transferring the library index to a receiving user endpoint device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure enhances audio reception by a microphone by leveraging visual data of the audio source (e.g., a person who is speaking). As discussed above, modern mobile wireless communications systems allow users to converse via phone from any location and at any time. For instance, mobile wireless communications allow users to make phone calls from home, work, the car or public transportation, the store, and the like. The audio quality of mobile wireless communications is constantly improving, making it easier for listeners to understand speakers (i.e., people who are speaking).

However, there are many circumstances in which the signal to noise ratio (SNR) in a received audio signal may still make the audio content difficult to decipher. For instance, if the speaker is located in a noisy environment such as a stadium, a crowd, a combat situation, an area with heavy vehicular traffic, or the like, this ambient noise may make it difficult for a listener to understand everything that the speaker is saying.

Examples of the present disclosure leverage the fact that, when one is looking at a speaker, it is easier to decipher what the speaker is saying, even in the presence of ambient noise. Conversely, if the speaker is turned away from the listener, this may make it more difficult for the listener to decipher what the speaker is saying. In other words, the SNR appears to improve when the speaker is turned directly toward the listener. Additionally, when the listener is able to see the shapes formed by the speaker's lips, the listener may be able to instinctively understand and mentally narrow down the possible sounds that the speaker could be making (e.g., lip reading). Thus, this visual information may help to improve auditory recognition. If the listener has some a priori knowledge of the speaker's unique speech patterns (e.g., sounds made by that speaker including audio artifacts, frequencies, and the like), this knowledge may further improve auditory recognition.

In mobile wireless technologies, when audio from a speaker is transferred from a source (i.e., speaker's) mobile device to a receiving (i.e., listener's) mobile device, the audio is typically first digitized and then used to index a particular audio artifact library which represents the raw audio. For instance, the sound "sp" may point to a library index of 43167 which holds a minimal digital representation required to reproduce the sound "sp." But instead of sending raw audio from the source mobile device to the receiving mobile device, what is actually transferred is the index 43167. A long sequence of indices (representing a sequence of the sounds uttered by the speaker) is then used on the receiving mobile device to retrieve the audio artifacts indexed from the library. This retrieved audio artifacts are then used by the receiving mobile device to recreate the original audio content from the source from the source mobile device. Thus, the listener "hears" the speaker, although no direct sampling of the raw audio content is ever transmitted, and minimal bandwidth is required for the transfer.

Examples of the present disclosure facilitate the retrieval of the correct library indices by leveraging visual data captured by a camera pointing at an audio source (e.g., a person who is speaking). The audio source may be located at a distance from a microphone or in a noisy environment, such that the quality of the audio stream captured by the microphone prohibits accurate deciphering of the audio content. The visual data captured by the camera may be used to inject helpful audio into the captured audio stream, thereby enhancing the quality of the captured audio stream and making retrieval of the correct library indices easier.

This enhances the operation of modern mobile devices, where one hundred percent of the audio stream received by a receiving mobile phone is injected from audio artifacts indexed from an artifact library. The difference is that the receiving mobile phone uses library indices, transmitted from the source mobile device, to look up the library artifacts for injection into the audio stream. Examples of the present disclosure index the audio artifacts using visual data collected by the camera and interpreted by a processing subsystem, thereby producing index values which are used to look up the audio artifacts and inject them into the audio stream. Instead of injecting one hundred percent of the audio as modern mobile devices do, examples of the present disclosure inject only enough audio for requisite enhancement. For instance, the user of the receiving mobile device may be listening to a distant person using the source mobile device (e.g., the distant person may be located a distance away from the microphone of the source mobile device), and what that distant person is saying may be unintelligible. Audio received by the microphone of the source mobile device can assess the SNR of the incoming audio stream using known methods. When the SNR indicates that the speech is becoming unintelligible (e.g., the SNR is below a predefined threshold), visual data captured by a camera pointing at the audio source (e.g., the distant person) may then be used to start indexing audio artifact libraries in order to find content which can be injected into the audio stream for the purpose of enhancing the quality of the captured audio.

Although examples of the present disclosure are discussed within the context of the present disclosure, it should be noted that the techniques disclosed herein could just as easily be used to enhance audio reception for voice communications in which one or more of the user endpoint devices used to conduct the voice communications are not mobile (e.g., a landline phone). These and other aspects of the present disclosure are described in greater detail below in connection with the examples of FIGS. 1-3.

Figure 1:
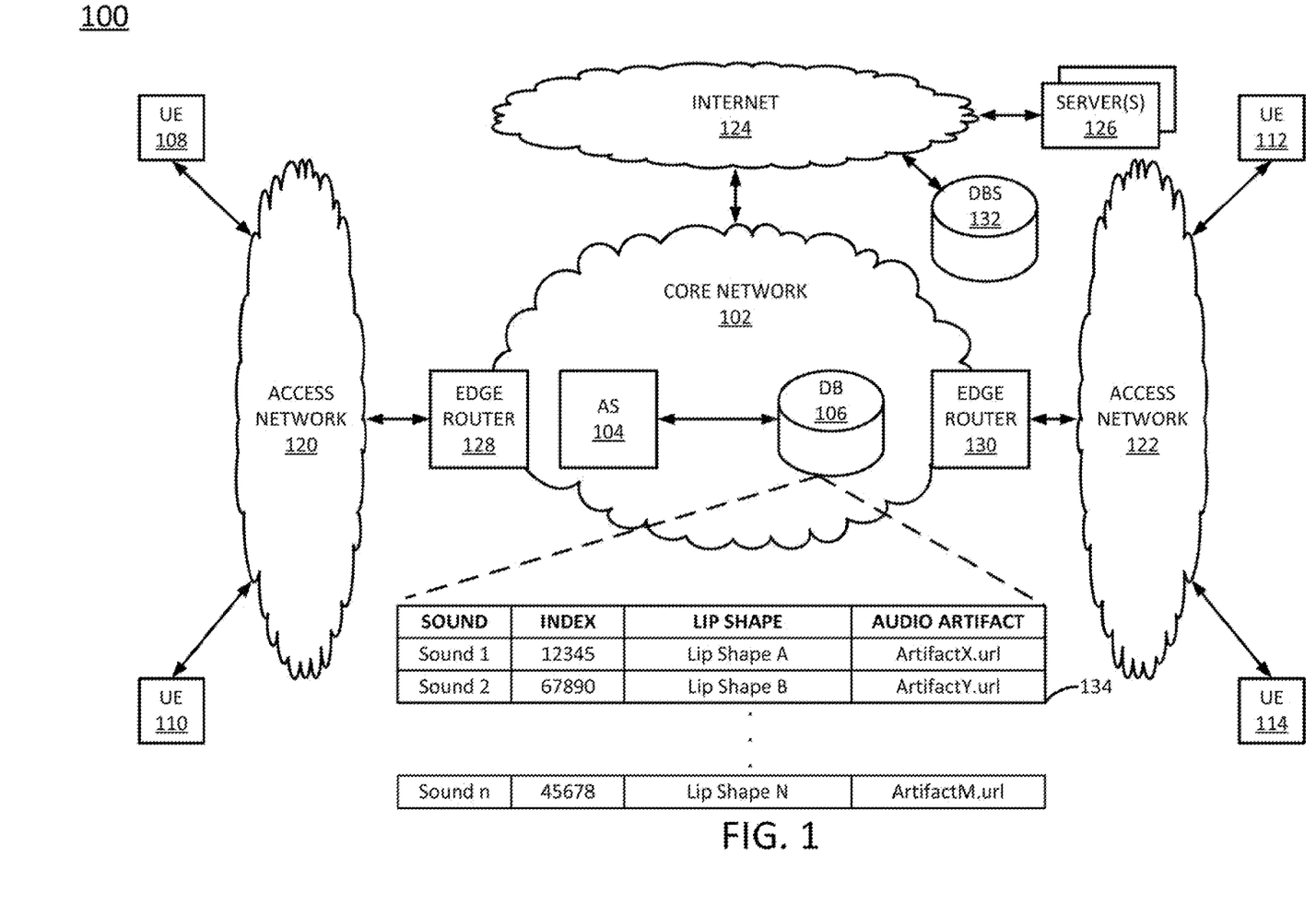
FIG. 1 illustrates an example system in which examples of the present disclosure for leveraging visual data in order to enhance audio reception by a microphone may operate.

To further aid in understanding the present disclosure, FIG. 1 illustrates an example system 100 in which examples of the present disclosure for leveraging visual data in order to enhance audio reception by a microphone may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, an Internet of Things (IoT) device, a bank or cluster of such devices, and the like. In one example, any one of the user endpoint devices 108, 110, 112, and 114 may be operable by a human user to facilitate voice communications with another user endpoint device 108, 110, 112, or 114 and to leverage visual data in order to enhance audio reception as part of the voice communications, as discussed in greater detail below. Thus, at least some of the user endpoint devices 108, 110, 112, and 114 may include at least a microphone, a speaker (i.e., a hardware speaker), and a camera (e.g., a still and/or video camera).

In one example, one or more servers 126 and one or more databases 132 may be accessible to user endpoint devices 108, 110, 112, and 114 via Internet 124 in general. The server(s) 126 and DBs 132 may store images of known individuals (e.g., registered users of the system 100), profiles of the known individuals which may be useful in deciphering audio streams containing utterance spoken by the known individuals, and indices for transferring audio content from a source user endpoint device to a receiving user endpoint device.

Figure 3:
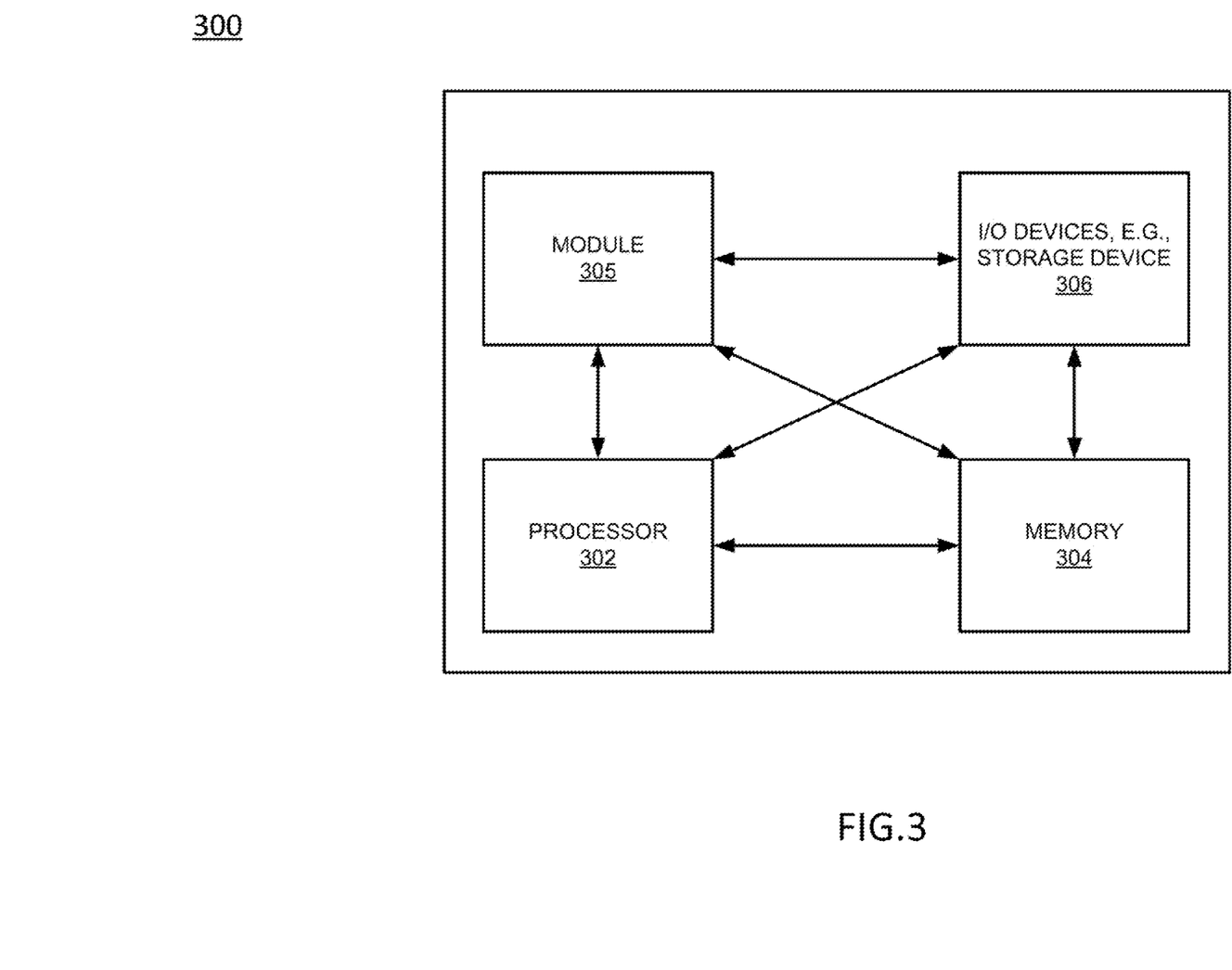
FIG. 3 depicts a high-level block diagram of a computing device specifically programmed to perform the functions described herein.

In accordance with the present disclosure, the AS 104 may be configured to provide one or more operations or functions in connection with examples of the present disclosure for leveraging visual data in order to enhance audio reception by a microphone, as described herein. The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 104 may be configured to recognize (e.g., using facial recognition and/or other techniques) an individual based on an image of the individual. In particular, the AS 104 may be configured to acquire an image of an individual who is speaking during a mobile voice communication. In other words, the individual may be the user of a source user endpoint device (i.e., a source of an audio stream that is part of the mobile voice communication). In one example, the image may be acquired directly from the source user endpoint device. The AS 104 may be further configured to retrieve a profile for the individual (e.g., from the DB 106) based on the recognition of the individual and to provide the profile for the individual to either or both of the source user endpoint device and a receiving user endpoint device (e.g., a receiver of the audio stream).

In one example, the DB 106 may store profiles of a plurality of users of the system 100. The plurality of users may optionally be registered with a service (e.g., provided, in part by the AS 104 and by an application executing on a user endpoint device such as UE 108, 110, 112, or 114) that enhances audio reception for communications over mobile devices. Each user profile may include at least one image of the associated user to facilitate recognition by the AS 104 as described above. Additionally, each profile may include, for the associated user, a mapping of sounds uttered by the user to lip shapes or movements of the user (e.g., the shape the user's lips make when the user utters a particular sound). As discussed in further detail below, due to individual speech patterns, accents, vocal tics, and the like, the shape a user's lips make when uttering a particular sound may deviate from the shape most people's lips make when uttering the same sound. Knowing the particularities of a given user's lip movements and sound production may help to better decipher the user's utterances and sounds spoken in the presence of noise, as discussed in further detail below. In a further example, a profile entry for a user may include at least one gesture of the user that the user is known to make when speaking a certain sound (e.g., the user always raises their eyebrows when speaking the sound "w").

In a further example, the DB 106 may store a library index 134, where the library index 134 in one example associates an index (e.g., a numerical or other types of identifier) with a sound that can be made by a person speaking (e.g., "Sound 1" is associated with index 12345). In a further example, the library index may associate additional information with the sound, such as a lip shape of a speaker that is associated with a speaker speaking the sound and an audio artifact (e.g., a sound file) that replicates the sound. In one example, the library index 134 may store a pointer or uniform resource locator (URL) indicating a storage location of the audio artifact. In one example, the information contained in the library index represents an average user rather than a specific user. For instance, the lip shape mapped to a given sound represents the lip shape that the average user (or most users) make when speaking the given sound. However, as discussed above, the shape that a specific user's lips make when speaking the given sound may deviate from the shape that the average user's lips make. However, when no personalized information is available for the specific user who is speaking, the library index 134 may provide enough information to assist in the deciphering of an audio stream originating with the user.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for leveraging visual data in order to enhance audio reception by a microphone, as described herein. One example method for leveraging visual data in order to enhance audio reception by a microphone is described in greater detail below in connection with FIG. 2.

In operation, a first user endpoint device (e.g., user endpoint device 108, 110, 112, or 114) may be in communication with a second user endpoint device (e.g., user endpoint device 108, 110, 112, or 114), where the communication includes voice communications exchanged between users of the first user endpoint device and the second user endpoint device. For instance, the first user endpoint device and the second user endpoint device may be mobile phones.

As the user of the first user endpoint device speaks into the microphone of the first user endpoint device, the first user endpoint device may monitor the SNR of the audio signal that the microphone is capturing. If the SNR falls below a predefined threshold (e.g., there is too much noise in the audio signal), this may indicate that measures should be taken to improve the decipherability of the audio signal. In one example, these measures include analyzing images of the user of the first user endpoint device. The first user endpoint device may acquire these images using an integrated camera (e.g., built into the first user endpoint device) or an external camera (e.g., integrated into an IoT device or other devices in the vicinity of the user of the first user endpoint device).

When the first user endpoint device encounters a sound in the audio signal for which the first user endpoint device cannot disambiguate (e.g., cannot tell with certainty if a sound is a "p" or a "b"), then the first user endpoint device may rely on the images to disambiguate. For instance, by examining the shape of the user's lips, the first user endpoint device may be able to determine the sound that was uttered (e.g., the sound was a "p" and not a "b"). In one example, the determination may consider not just the images, but also a profile of the user (e.g., retrieved from the DB 106). For instance, by examining the shape of the user's lips in connection with knowledge of the user's speaking patterns (or the speaking patterns of other users like the user, such as users of a similar age or demographic), the first user endpoint device may be able to disambiguate between two or more possible sounds to correctly decipher the audio signal.

Once the first user endpoint device has correctly deciphered a sound, the first user endpoint device may retrieve an index associated with the sound (e.g., from the library index 134) and may provide the index to the second user endpoint device. Upon receipt of the index, the second user endpoint device may retrieve the associated sound and may concatenate the associated sound with other sounds associated with other indices received from the first user endpoint device in order to reconstruct the utterance spoken by the user of the first user endpoint device for listening by the user of the second user endpoint device.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and/or 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
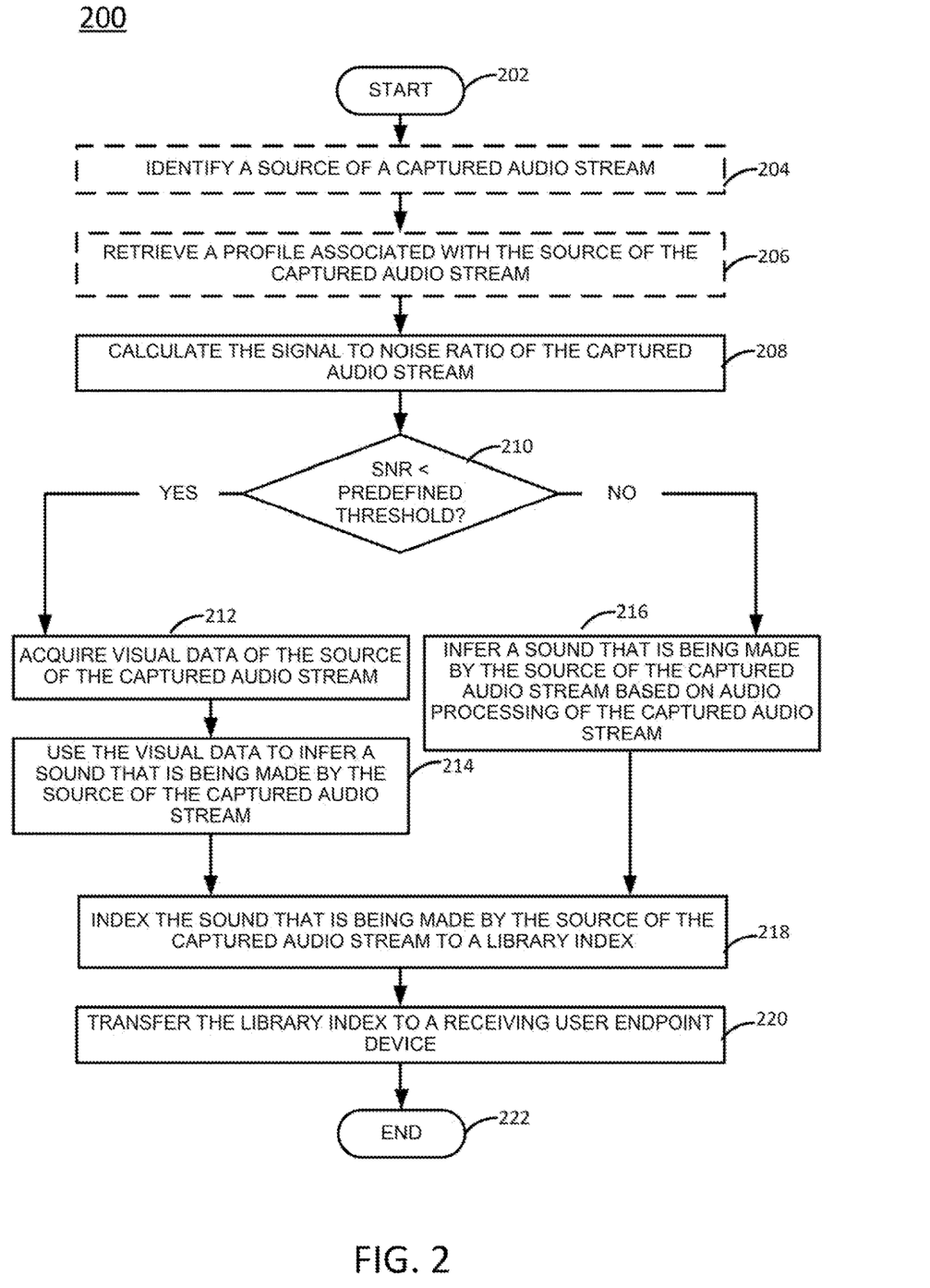
FIG. 2 illustrates a flowchart of an example method for leveraging visual data in order to enhance audio reception by a microphone in accordance with the present disclosure.

To further aid in understanding the present disclosure, FIG. 2 illustrates a flowchart of a method 200 for leveraging visual data in order to enhance audio reception by a microphone in accordance with the present disclosure. In one example, the method 200 may be performed by a user endpoint device that captures audio content from an audio source (e.g., a source user endpoint or mobile device), such as any of the user endpoint devices 108, 110, 112, or 114 illustrated in FIG. 1. However, in other examples, the method 200 may be performed by another device, such as the processor 302 of the system 300 illustrated in FIG. 3. For the sake of example, the method 200 is described as being performed by a processing system.

The method 200 begins in step 202. In optional step 204 (illustrated in phantom), the processing system may identify a source of a captured audio stream. In one example, the source of the captured audio stream may be a person who is speaking into the microphone of a mobile device (e.g., "John Smith"). The person may be located proximate to the microphone (e.g., holding the mobile device up to their ear/mouth), or the person may be located at a distance from the mobile device (e.g., placing the mobile device "on speaker").

In one example, the source of the captured audio stream may be identified based on visual data. For instance, a camera that is in communication with the processing system may capture still and/or video images of the source of the captured audio stream and may provide the images to the processing system. The processing system may then utilize image processing techniques (e.g., facial recognition) to recognize and identify the source of the captured audio stream. In another example, an external system (e.g., a remote device or application server) may identify the source of the captured audio stream based on the images and may provide the identification of the source of the captured audio stream to the processing system.

In another example, the source of the captured audio stream may be identified based on audio data. For instance, the processing system may perform audio processing techniques (e.g., speech and/or speaker recognition) on the captured audio stream to recognize and identify the source of the captured audio stream. In another example, an external system (e.g., a remote device or application server) may identify the source of the captured audio stream based on the captured audio stream and may provide the identification of the source of the captured audio stream to the processing system.

In another example, the source of the captured audio stream may self-identify to the processing system. For instance, if the source of the captured audio stream is a person who is speaking, the person may log into an account using a unique login and/or password by which the person can be identified. Alternatively, the person may speak their name or another identifier by which they can be identified by the processing system. In another example, the source of the captured audio stream may self-identify to an external system (e.g., a remote device or application server), and the external system may provide the identification of the source of the captured audio stream to the processing system.

In another example, the processing system may be unable to discern the specific identity of the source of the captured audio stream, but may alternatively identify a "type" of the source of the captured audio stream, e.g., as determined by available demographic clues. These demographic clues may point to a library of audio artifacts which correlate to that "type" of source. For instance, if the source of the captured audio stream appears to be an adult female or a male child, the associated audio artifacts are likely to be different.

In optional step 206 (illustrated in phantom), the processing system may retrieve a profile associated with the source of the captured audio stream. In one example, the profile associated with a specific source may be used to filter a prescribed subset of library artifacts. This prescribed subset of library artifacts may comprise (or assign greater confidence to) sounds that the specific source is highly likely to make and may omit (or assign lower confidence to) sounds that the specific source is highly unlikely to make. The sounds that a specific source is highly likely or highly unlikely to make (or the confidences associated with those sounds) may be determined using one or more machine learning techniques (e.g., support vector machines, convolutional neural networks, linear regression, random forest, or the like) to analyze prior audio streams originating with the specific source. Thus, the prescribed subset may be of higher value in the functionality of the system due to the fact that the audio artifacts are the product of machine learning due to prior interactions with the source.

In step 208, the processing system may calculate the signal to noise ratio (SNR) of the captured audio stream. In one example, any one or more known methods for comparing the level of a desired signal to the level of background noise may be used to calculate the SNR of the captured audio stream. For instance, SNR can be determined by using a fixed formula that compares the level of the desired signal to the level of detected background noise and returns the ratio, which shows whether the noise level is impacting the desired signal.

In step 210, the processing system may determine whether the SNR of the captured audio stream is lower than a predefined threshold. In other words, the processing system may determine whether the SNR is so low that the noise (e.g., ambient or background noise) makes it difficult to understand the sounds that are emanating from the source of the captured audio stream. In one example, the predefined threshold may be empirically determined based on an SNR at which a confidence of the processing system to correctly identify audio artifacts falls below an acceptable level for understanding by a user of a receiving user endpoint device (e.g., a person who is listening to the source of the captured audio stream).

If the processing system determines in step 210 that the SNR of the captured audio stream is lower than a predefined threshold, then the method 200 may proceed to step 212. In step 212, the processing system may acquire visual data of the source of the captured audio stream. For instance, the processing system may instruct a still and/or video camera located in proximity to the source of the captured audio stream to capture images of the source of the captured audio stream. In one example, where the source of the captured audio stream is a person who is speaking, the images may be focused on the person's face, and more particularly on the person's mouth. The camera may be integrated into the same device as the processing system (e.g., a source user endpoint device or mobile device) or may be an external camera (e.g., part of a proximal IoT system) with which the processing system can communicate.

In step 214, the processing system may use the visual data to infer a sound that is being made by the source of the captured audio stream. In one example, the visual data may be used to disambiguate between a plurality of (i.e., two or more) potential sounds that were identified through audio processing of the captured audio stream. For instance, based on audio processing of the captured audio stream, the processing system may determine that a particular sound produced by a speaker is either a "p" or a "b." However, due to a challenging SNR, the processing system may be unable to differentiate between the "p" and the "b" with sufficient confidence. In this case, the processing system may analyze images of the speaker's mouth movements in order to determine whether the speaker uttered a "p" or a "b." Thus, the processing system may utilize audio processing to filter a library of potential sounds uttered by the speaker down to a narrow set. The processing system may then utilize image processing of the visual data in order to select one sound from among the narrow set.

In one example, a time-sequence of mouth shapes of the speaker is used to identify an index of audio artifacts. As discussed above, when the speaker makes the mouth shape for speaking the sound "p," this visual cue can be used to select an index which itself points to a library of audio artifacts which, when injected into the audio receive path, enhance the sound for "p" for the listener using the receiving user endpoint device. Although mouth shape could, conceivably, be inferred from a single still image, in one example a sequence of images is acquired and analyzed to infer mouth shape. Inferring the mouth shape from the sequence of images is expected to greatly improve the interpretation of the camera outputs. For instance, in a single image frame, it may be difficult to discern between the mouth shapes for speaking the "p" and "b" sounds, as both sounds are bilabial based. However, a brief time sequence of images may allow better differentiation. Moreover, although examples of the present disclosure may make simple assumptions as to which sources of audio streams will make which types of sounds based on demographic "type" as discussed above, having a profile or history of specific speaker will greatly improve the use of visual information to index of audio artifacts.

In one example, filtering the library of potential sounds down to the narrow set may be aided by consulting a profile of the source of the captured audio stream, if a profile is retrieved in step 206. For instance, as discussed above, the profile may help the processing system to determine which sounds a specific source is likely or unlikely to make. Thus, if the processing system initially filters the library of potential sounds down to a preliminary set, the preliminary set could be further narrowed based on the confidences associated with the individual sounds in the preliminary set in the profile. This profile-based filtering may then produce the narrow set from which visual data can be used to select a single sound.

Referring back to step 210, however, the processing system determines in step 210 that the SNR of the captured audio stream is not lower than a predefined threshold (e.g., is equal to or higher than the predefined threshold), then the method 200 may proceed to step 216. In step 216, the processing system may infer a sound that is being made by the source of the captured audio stream based on audio processing of the captured audio stream (i.e., without supplementation with visual data). Thus, step 216 may represent a conventional technique for inferring sounds that are present in a captured audio stream.

In step 218, the processing system may index the sound that is being made by the source of the captured audio stream (as determined using audio data in combination with visual data in accordance with steps 212-214 or as determined using audio data only in accordance with step 216) to a library index. As discussed above, the library index may comprise a numerical representation of the sound in a library of audio artifacts.

In step 220, the processing system may transfer the library index to a receiving user endpoint device (e.g., a mobile device). As discussed above, the receiving user endpoint device may utilize the library index to look up and retrieve the audio artifact corresponding to the library index in an audio library. The receiving user endpoint device may then reconstruct the captured audio stream by concatenating a plurality of audio artifacts that are retrieved in a similar manner.

The method 200 may end in step 222. However, in some examples, steps of the method 200 (e.g., any one or more of steps 204-218) may be repeated until the user asks the processing system to terminate the method 200 (e.g., by closing an application that executes the method 200, powering down a device that runs the application, or the like). For instance, for as long as the user is speaking and producing an audio stream for capture, the method 200 may continue to acquire and process the audio stream and may additionally acquire and process visual data as necessary to facilitate processing of the audio stream.

Thus, examples of the present disclosure facilitate the retrieval of the correct library indices by leveraging visual data captured by a camera pointing at an audio source (e.g., a person who is speaking). The audio source may be located at a distance from a microphone or in a noisy environment, such that the quality of the audio stream captured by the microphone prohibits accurate deciphering of the audio content. The visual data captured by the camera may be used to inject helpful audio into the captured audio stream, thereby enhancing the quality of the captured audio stream and making retrieval of the correct library indices easier.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

Although examples of the present disclosure are discussed within the context of capturing and processing an audio stream on the source side of a communication (i.e., at the source of the audio stream), in other examples, the techniques disclosed herein could be implemented on the receiving side. For instance, a recording device might be used by a hearing-impaired person, where the recording device is then used to provide meaningful representation (e.g., mechanical or visual) of the audio to the hearing-impaired person. For instance, a text transcription of the audio could be generated for viewing. As another example, a hearing-impaired person who relies on lip-reading to interpret what is being said may be able to receive audio information even when they are looking somewhere other than at the speaker of the speaker's lips.

Moreover, it should be noted that examples of the present disclosure are language agnostic. That is, the techniques disclosed herein may be used to enhance the audio reception of an utterance spoken in any language. Furthermore, two individuals engaged in a conversation via respective mobile devices may speak different languages, and examples of the present disclosure could be used to guide selections of audio artifact sets which produce sounds in different languages. In a further example, a recursive feature of the present disclosure allows received audio to be used to further refine the audio artifact subset. For instance, a source of an audio stream may be able to speak in multiple languages, and the selection of the audio artifact subset (e.g., language dependent artifact subsets) will depend on which language the source of the audio stream is speaking at a given time. The source of the audio stream may even change languages in the middle of speaking, and this knowledge can be used to dynamically redirect the camera interpretation by the processing system to a different index subset.

In order to facilitate creation of audio artifact subsets for a specific individual using machine learning techniques, historical associations may be made between visible cues of the specific individual and high-quality audio reception. This implies that when a receiving mobile device is able to reliably measure what the specific individual is saying and associate what the specific individual is saying with visible cues, then the information about the visible cues can be used to enhance the historical audio artifact database for the specific individual as an audio source.

In a further example, body language or gestures could be further used to enhance the inference of likely audio artifacts from visual data. For example, whenever a specific individual speaks a particular sound or a specific word, the specific individual may make a corresponding gesture (e.g., raise their eyebrows a bit, use their hands, or lift their chin, etc.). This corresponding gesture can be learned using machine learning techniques, and the association between the particular sound or specific word and the gesture can be used in the future to enhance the ability of the processing system to properly select audio artifacts from a narrow set of audio artifacts for injection into a received audio stream.

In a further example, historical audio artifacts for any specific individual can be shared among a plurality of devices. This means a particular device (e.g., mobile device) comprising a camera, a microphone, and a processing system need not have any historical experience with the specific individual as an audio source. If the audio source can be identified as the specific individual, then the device can make a request for historical audio artifacts for the specific individual, even if the device has not been used by the specific individual in the past. For instance, the device may capture and transmit images of the specific individual to a remote system, and the remote system may identify the specific individual. Based on the identification of the specific individual provided by the remote system, the device may download any available audio artifacts associated with the specific individual. Thus, as an example, a group of of police officers who have never worked together before may be able to enhance audio reception among the group when working in a noisy environment.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a server (such as might be used to perform the method 200) could be implemented as illustrated in FIG. 3.

As depicted in FIG. 3, the system 300 comprises a hardware processor element 302, a memory 304, a module 305 for leveraging visual data in order to enhance audio reception by a microphone, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for leveraging visual data in order to enhance audio reception by a microphone may include circuitry and/or logic for performing special purpose functions relating to the operation of a user endpoint device. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for leveraging visual data in order to enhance audio reception by a microphone (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for leveraging visual data in order to enhance audio reception by a microphone (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
    calculating, by a processing system including at least one processor, a signal to noise ratio of a captured audio stream, wherein the captured audio stream comprises an utterance spoken in a first language;
    determining, by the processing system, that the signal to noise ratio of the captured audio stream is lower than a predefined threshold;
    acquiring, by the processing system, visual data of a source of the captured audio stream in response to the determining that the signal to noise ratio of the captured audio stream is lower than the predefined threshold;
    using, by the processing system, the visual data to infer a sound that is being made by the source of the captured audio stream;
    indexing, by the processing system, the sound that is being made by the source of the captured audio stream to a library index; and
    transferring, by the processing system, the library index to a receiving user endpoint device, wherein the library index that is transferred corresponds to a sound that is used to reconstruct the utterance in a second language different from the first language.

2. The method of claim 1, wherein the processing system is part of a first mobile device, and the receiving user endpoint device is a second mobile device.

3. The method of claim 1, wherein the source of the captured audio stream is a person who is speaking.

4. The method of claim 3, wherein the visual data of the source of the captured audio stream comprises a sequence of images of the person who is speaking.

5. The method of claim 4, wherein the sequence of images depicts lip movements of the person who is speaking.

6. The method of claim 5, wherein the using comprises:
    narrowing a plurality of potential sounds to a narrower set of sounds, based on audio processing of the captured audio stream; and
    disambiguating between the narrower set of sounds based on the visual data of the source of the captured audio stream to infer the sound that is being made by the source of the captured audio stream.

7. The method of claim 6, wherein the disambiguating is further based on a profile of the source of the captured audio stream.

8. The method of claim 7, wherein the profile of the source of the captured audio stream identifies sounds the source of the captured audio stream is likely to make and sounds the source of the captured audio stream is unlikely to make.

9. The method of claim 7, wherein the profile is specific to an individual who is the source of the captured audio stream.

10. The method of claim 7, wherein the profile is specific to a demographic group to which an individual who is the source of the captured audio stream belongs.

11. The method of claim 7, wherein the profile is shared among a plurality of devices including the processing system and the receiving user endpoint device.

12. The method of claim 1, wherein the receiving user endpoint device utilizes the library index to retrieve an audio artifact corresponding to the library index in the library of audio artifacts.

13. The method of claim 12, wherein the receiving user endpoint device reconstructs the captured audio stream by concatenating a plurality of audio artifacts retrieved from the library of audio artifacts, including the audio artifact corresponding to the library index in the library of audio artifacts.

14. The method of claim 1, further comprising:
identifying, by the processing system prior to the calculating, the source of the captured audio stream; and
retrieving, by the processing system, a profile associated with the source of the captured audio stream for use in processing the captured audio stream.

15. The method of claim 1, wherein the library index is used by the receiving user endpoint device to convert an audio signal to text.

16. The method of claim 1, wherein the visual data includes a gesture made by an individual who is the source of the captured audio stream, wherein the gesture involves a movement of a part of a body of the individual other than a mouth.

17. The method of claim 1, wherein the library index further associates an audio artifact that replicates the sound that is being made by the source of the captured audio stream.

18. The method of claim 1, wherein the library index comprises a numerical representation of the sound that is being made by the source of the captured audio stream in a library of audio artifacts.

19. A non-transitory computer-readable medium storing instructions which, when executed by a processing system including at least one processor, cause the processing system to perform operations, the operations comprising:
calculating a signal to noise ratio of a captured audio stream, wherein the captured audio stream comprises an utterance spoken in a first language;
determining that the signal to noise ratio of the captured audio stream is lower than a predefined threshold;
acquiring visual data of a source of the captured audio stream in response to the determining that the signal to noise ratio of the captured audio stream is lower than the predefined threshold;
using the visual data to infer a sound that is being made by the source of the captured audio stream;
indexing the sound that is being made by the source of the captured audio stream to a library index; and
transferring the library index to a receiving user endpoint device, wherein the library index that is transferred corresponds to a sound that is used to reconstruct the utterance in a second language different from the first language.

20. A device comprising:
a processing system including at least one processor; and
a computer-readable medium storing instructions which, when executed by the processing system, cause the processing system to perform operations, the operations comprising:
calculating a signal to noise ratio of a captured audio stream, wherein the captured audio stream comprises an utterance spoken in a first language;
determining that the signal to noise ratio of the captured audio stream is lower than a predefined threshold;
acquiring visual data of a source of the captured audio stream in response to the determining that the signal to noise ratio of the captured audio stream is lower than the predefined threshold;
using the visual data to infer a sound that is being made by the source of the captured audio stream;
indexing the sound that is being made by the source of the captured audio stream to a library index; and
transferring the library index to a receiving user endpoint device, wherein the library index that is transferred corresponds to a sound that is used to reconstruct the utterance in a second language different from the first language.

\* \* \* \* \*